United States Patent
Wang et al.

(10) Patent No.: US 7,818,554 B2
(45) Date of Patent: Oct. 19, 2010

(54) EXPANSION DEVICE FOR BIOS CHIP

(75) Inventors: Yong-An Wang, Shenzhen (CN); Gang Chen, Shenzhen (CN); Ya-Qiong Niu, Shenzhen (CN); Zong-Bao Xiao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 687 days.

(21) Appl. No.: 11/766,108

(22) Filed: Jun. 21, 2007

(65) Prior Publication Data

US 2008/0177924 A1    Jul. 24, 2008

(30) Foreign Application Priority Data

Dec. 29, 2006    (CN)    ............... 2006 2 0145402 U

(51) Int. Cl.
*G06F 9/00*    (2006.01)

(52) U.S. Cl. ............... 713/1; 713/2; 710/13; 710/300; 710/301

(58) Field of Classification Search ............... 710/300, 710/13, 62, 301; 713/1, 2; 714/23, 36, 37; 365/51

See application file for complete search history.

(56) References Cited

U.S. PATENT DOCUMENTS

| | | | | |
|---|---|---|---|---|
| 5,471,674 A * | 11/1995 | Stewart et al. | ............... | 713/2 |
| 5,627,413 A * | 5/1997 | Mughir et al. | ............... | 307/86 |
| 5,815,706 A * | 9/1998 | Stewart et al. | ............... | 713/2 |
| 5,835,760 A * | 11/1998 | Harmer | ............... | 713/2 |
| 5,865,631 A * | 2/1999 | Berto et al. | ............... | 439/59 |
| 6,425,079 B1 * | 7/2002 | Mahmoud | ............... | 713/2 |
| 7,010,679 B2 * | 3/2006 | Yang | ............... | 713/2 |
| 7,010,680 B2 * | 3/2006 | Nakaya | ............... | 713/100 |
| 7,100,088 B2 * | 8/2006 | Kuo | ............... | 714/36 |
| 7,185,189 B2 * | 2/2007 | Stevens | ............... | 713/2 |
| 7,188,235 B2 * | 3/2007 | Wang et al. | ............... | 713/1 |
| 7,254,701 B2 * | 8/2007 | Lu | ............... | 713/1 |

(Continued)

OTHER PUBLICATIONS

Super Micro Computer, Inc. AOC-SASLP-MV8 Add-on Card. User's Manual. Revision 1.0a. Mar. 10, 2009.*

(Continued)

*Primary Examiner*—Mark Rinehart
*Assistant Examiner*—Matthew D Spittle
(74) *Attorney, Agent, or Firm*—Frank R. Niranjan

(57) ABSTRACT

A motherboard assembly of a computer includes a motherboard (80) and an expansion device. The expansion device is connected to the motherboard. The expansion device includes a BIOS chip (10), a first connector (20) and at least one second connector (30). The first connector is connected to a socket (40) mounted on the motherboard. The second connector is capable of connecting to a burning device (90) for restoring the BIOS chip. The BIOS chip is connected to the first connector, the second connector, and to a signal choice terminal of the motherboard which acts to access the BIOS chip through the first connector and the socket such that the BIOS chip of the expansion device can replace a BIOS chip mounted on the motherboard to be accessed when the computer is powered up to be tested, thereby protecting the BIOS chip mounted on the motherboard being damaged in test.

5 Claims, 3 Drawing Sheets

U.S. PATENT DOCUMENTS

| | | |
|---|---|---|
| 7,451,304 B2 * | 11/2008 | Chang et al. .................... 713/2 |
| 7,613,952 B2 * | 11/2009 | Ko et al. ........................ 714/36 |
| 2003/0076311 A1 * | 4/2003 | Lin et al. ..................... 345/204 |
| 2004/0153810 A1 * | 8/2004 | Kuo ............................. 714/36 |
| 2006/0026462 A1 * | 2/2006 | Zhang et al. .................. 714/36 |
| 2006/0047994 A1 * | 3/2006 | Pu et al. ........................ 714/2 |
| 2008/0162912 A1 * | 7/2008 | Wang ............................ 713/1 |

OTHER PUBLICATIONS

Dell Computer Corporation. Dell PowerEdge 2200 Systems. Service Manual. Jun. 1997.*

DEW Associates Corporation. Resolving Bios and Drive Size Barriers. 2003.*

* cited by examiner

EXPANSION DEVICE FOR BIOS CHIP

BACKGROUND OF THE INVENTION

1. Field of the Invention

The present invention relates to expansion devices, and more particularly to an expansion device of a Basic Input Output System (BIOS) chip for a motherboard of a computer.

2. Description of Related Art

A BIOS chip is very important in a computer for storing the vital program of the computer. The BIOS chip is a ROM (Read Only Memory) chip on a motherboard of the computer. The BIOS chip is used for the start-up of the computer and the controlling of the hardware in the computer. In a testing process for the computer, the BIOS chip is usually accessed frequently, and the content therein sometimes may be damaged. When the content in the BIOS chip is damaged, the computer will not power up, and the BIOS chip needs to be replaced. The BIOS chip is commonly welded on the motherboard, therefore it is inconvenient and time-consuming to detach the BIOS chip from the motherboard, and chances of damage to the motherboard are greater.

What is needed, therefore, is an expansion device of a BIOS chip for a motherboard of a computer.

SUMMARY OF THE INVENTION

A motherboard assembly includes a motherboard and an expansion device. The motherboard includes a socket. The expansion device is connected to the motherboard. The expansion device includes a BIOS chip, a first connector and at least one second connector. The first connector is connected to the socket mounted on the motherboard. The second connector is capable of connecting to a burning device configured for restoring the BIOS chip. The BIOS chip is connected to the first and second connectors, and is connected to a signal choice terminal of the motherboard which acts to access the BIOS chip through the first connector and the socket.

Other advantages and novel features of the present invention will become more apparent from the following detailed description of a preferred embodiment when taken in conjunction with the accompanying drawings, in which:

DETAILED DESCRIPTION OF THE INVENTION

Figure 1:
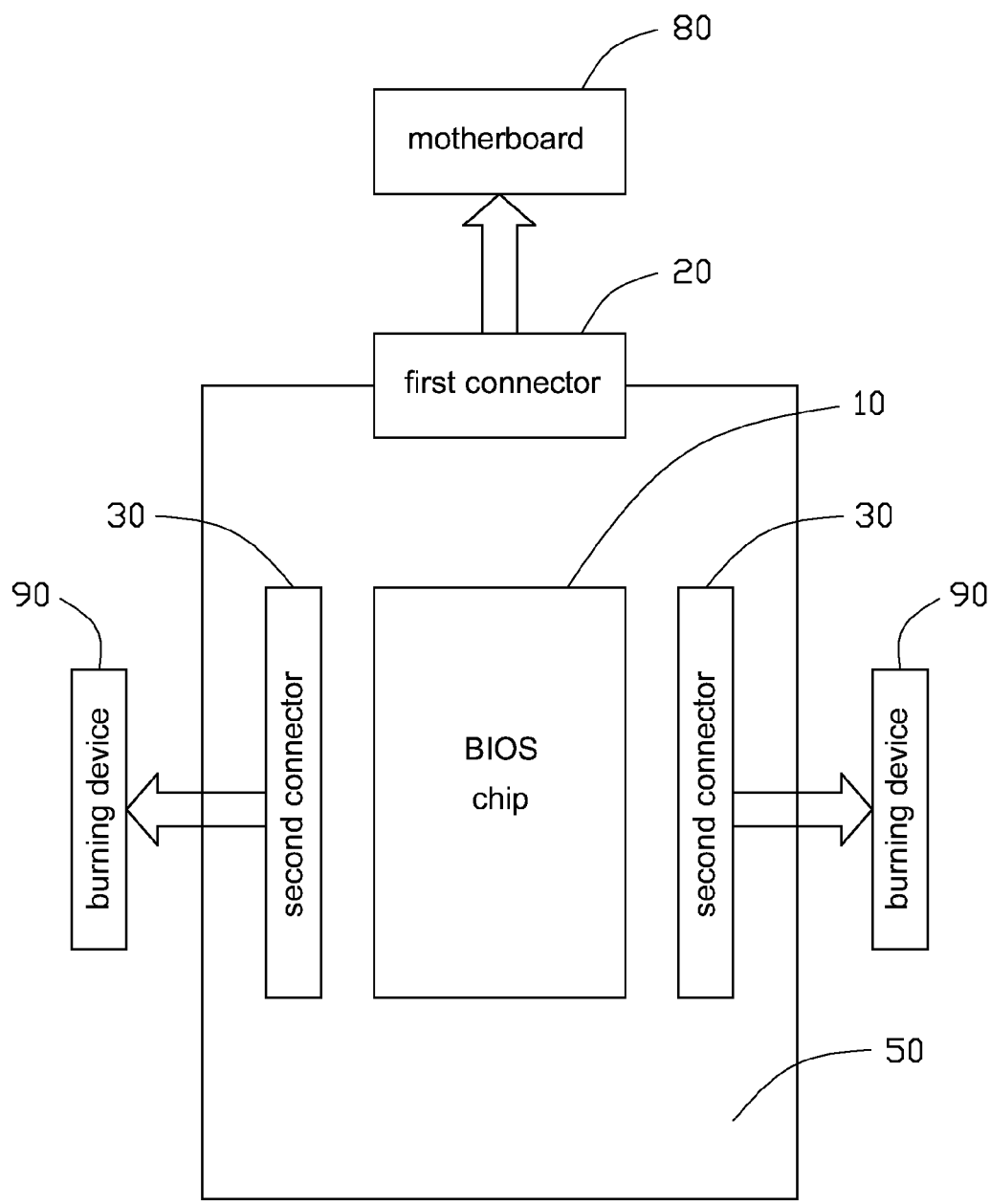
FIG. 1 is a configuration diagram of an expansion device for a BIOS chip in accordance with a preferred embodiment of the present invention.
Figure 2:
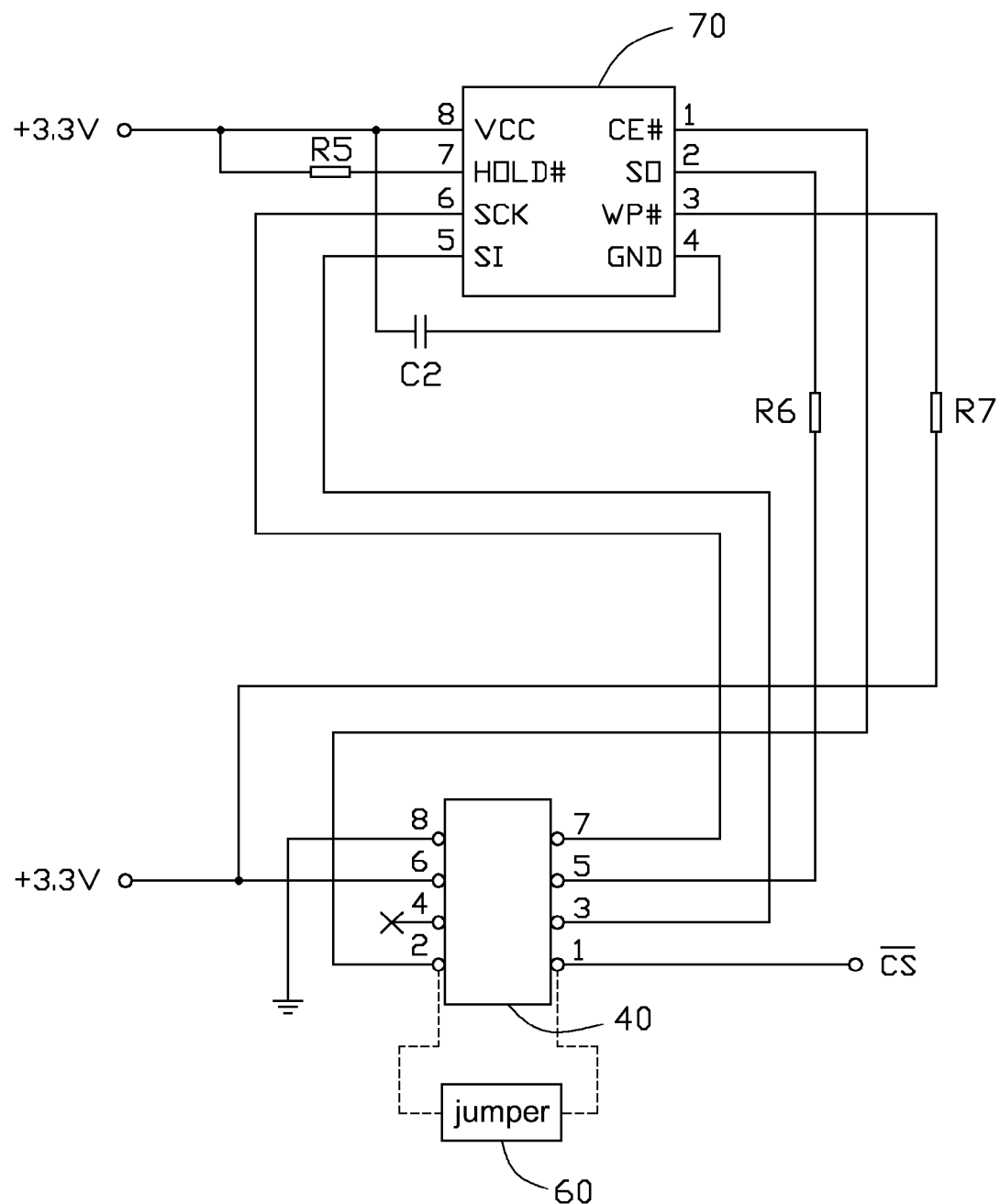
FIG. 2 is a circuit diagram of a BIOS chip and a socket on a motherboard.

Referring to FIGS. 1 and 2, an expansion device for a BIOS chip of an embodiment of the present invention includes a plate 50, a BIOS chip 10, a first connector 20 for inserting into a socket 40 mounted on a motherboard 80 of a computer (not shown), and a pair of second connectors 30 for inserting into a burning device 90. The BIOS chip 10 is mounted in the center of the plate 50. The first connector 20 is mounted at an edge of the plate 50 in front of the BIOS chip 10. The second connectors 30 are mounted at opposite sides of the plate 50.

FIG. 2 shows a circuit diagram of a BIOS chip 70 welded on the motherboard 80 connected with the socket 40. The BIOS chip 70 includes eight pins: a pin 1 is a signal choice terminal (CE#), a pin 2 is a signal output terminal (SO), a pin 3 is a signal write-protecting terminal (WP#), a pin 4 is a ground terminal (GND), a pin 5 is a signal input terminal (SI), a pin 6 is a clock signal terminal (SCK), a pin 7 is a hold signal terminal (HOLD#), a pin 8 is a power source terminal (VCC). When the pin 1 (CE#) of the BIOS chip 70 is at low level, the BIOS chip 70 is selected and can be accessed. The socket 40 also includes eight pins for transmitting signals. A pin 1 is connected to a signal choice terminal ($\overline{CS}$) of the motherboard 80, which is a low level signal for accessing the BIOS chip 70. A pin 2 is connected to the pin 1 (CE#) of the BIOS chip 70. A pin 3 is connected to the pin 5 (SI) of the BIOS chip 70. A pin 4 is empty. A pin 5 is connected to the pin 2 (SO) of the BIOS chip 70 through a resistor R6. A pin 6 is connected to the pin 3 (WP#) of the BIOS chip 70 through a resistor R7. The pin 6 is also connected to a +3.3V voltage terminal on the motherboard 80. A pin 7 is connected to the pin 6 (SCK) of the BIOS chip 70. A pin 8 is connected to ground. The pin 4 (GND) of the BIOS chip 70 is connected to the pin 8 (VCC) of the BIOS chip 70 through a capacitor C2. The pin 7 (HOLD#) of the BIOS chip 70 is connected to the pin 8 (VCC) of the BIOS chip 70 through a resistor R5. The pin 8 (VCC) is also connected to the +3.3V voltage terminal. When the computer is turned on, the pin 1 and pin 2 of the socket 40 are connected together with a jumper 60. After the computer is turned on, the signal from the signal choice terminal ($\overline{CS}$) is transmitted to the pin 1 (CE#) of the BIOS chip 70 through the socket 40, thereby the BIOS chip 70 on the motherboard 80 is accessed and begins running.

Figure 3:
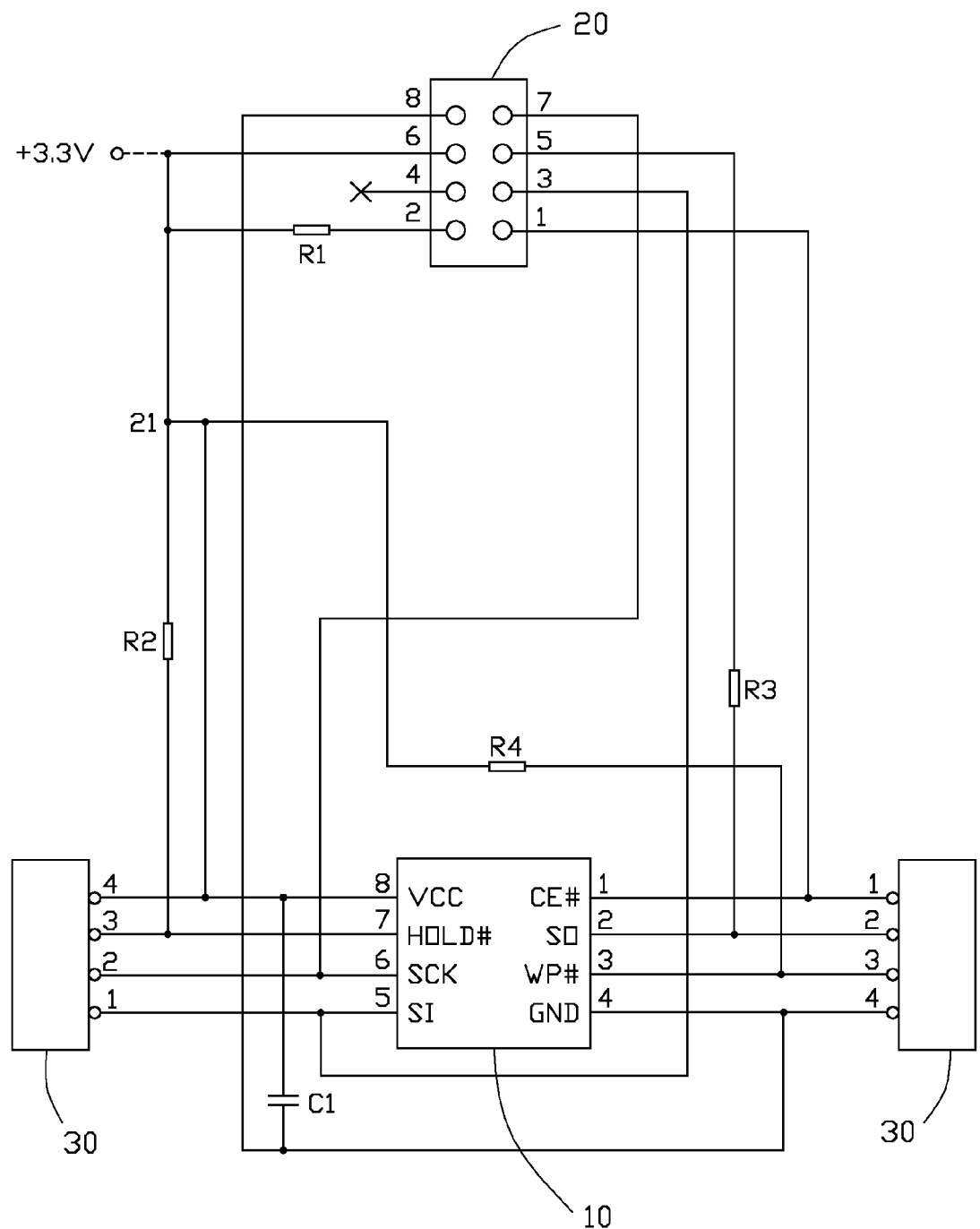
FIG. 3 is a circuit diagram of FIG. 1.

FIG. 3 shows a circuit diagram of the expansion device of FIG. 1. A configuration of the BIOS chip 10 on the expansion device is the same as that of the BIOS chip 70 on the motherboard 80, and also includes eight same function pins 1~8 as the pins 1~8 of the BIOS chip 70. When a pin 1 (CE#) of the BIOS chip 10 is at low level, the BIOS chip 10 of the expansion device is selected and can be accessed. The first connector 20 includes eight pinholes for the pins of the socket 40 on the motherboard 80 inserting into. Each second connector 30 includes four pins for inserting into the corresponding burning device 90.

A connection between the first connector 20 and the BIOS chip 10 is the same as that between the socket 40 and the BIOS chip 70 of the motherboard 80. A pinhole 1 of the first connector 20 is connected to the pin 1 (CE#) of the BIOS chip 10. A pinhole 2 is connected to a pinhole 6 of the first connector 20 through a resistor R1, and the pinhole 2 is also connected to a node 21 through the resistor R1. The node 21 is connected to a pin 8 (VCC), and a pin 7 (HOLD#) of the BIOS chip 10 through a resistor R2, the node is also connected to a pin 3 (WP#) of the BIOS chip 10 through a resistor R4. A pinhole 3 of the first connector 20 is connected to a pin 5 (SI) of the BIOS chip 10. A pinhole 4 of the first connector 20 is empty. A pinhole 5 of the first connector 20 is connected to a pin 2 (SO) of the BIOS chip 10 through a resistor R3. A pinhole 6 of the first connector 20 is connected to the +3.3V voltage terminal of the motherboard 80 through the pin 6 of the socket 40 when the expansion device is inserted on the motherboard 80. A pinhole 7 of the first connector 20 is connected to a pin 6 (SCK) of the BIOS chip 10. A pinhole 8 of the first connector 20 is connected to a pin 4 (GND), and the pin 8 (VCC) of the BIOS chip 10 through a capacitor C1. Pins 1, 2, 3, 4 of one of the second connectors 30 are respectively connected to pins 1, 2, 3, 4 of the BIOS chip 10. Pins 1, 2, 3, 4 of another second connector 30 are respectively connected to pins 5, 6, 7, 8 of the BIOS chip 10. The second connectors 30 can also be incorporated into a connector including eight pins in other embodiments.

When the computer is being tested, the BIOS chip 70 on the motherboard 80 is accessed frequently. If content of the BIOS chip 70 is damaged, there is no need to detach the BIOS chip 70 welded on the motherboard 80, it needs to simply pull out the jumper 60 from the socket 40, and insert the expansion device with intact content in the BIOS chip 10 into the motherboard 80, and each pinhole of the first connector 20 on the expansion device is engaged with the corresponding pin of the socket 40 on the motherboard 80. At this time, the signal choice terminal ($\overline{CS}$) is connected to the pin 1 (CE#) of the BIOS chip 10 through the pin 1 of the socket 40 and the pinhole 1 of the first connector 20. The pin 1 (CE#) of the BIOS chip 10 on the expansion device goes to low level. The pin 1 (CE#) of the BIOS chip 70 on the motherboard 80 is connected to the +3.3V voltage terminal through the pin 2 of the socket 40 and the pinhole 2 of the first connector 20, and goes to high level. Therefore, when the computer is powered up, the BIOS chip 10 on the expansion device will be accessed and the BIOS chip 70 on the motherboard 80 will not. After the computer is powered up normally, the expansion device can be detached from the motherboard 80. The BIOS chip 70 can be automatically restored by the computer once it is running normally. The jumper 60 can then be reconnected to pins 1 and 2 of the socket 40, and then the BIOS chip 70 can be accessed to ensure normal running of the computer.

In addition, the expansion device can be connected to the motherboard 80 before the computer is tested, for testing the computer through the BIOS chip 10 on the expansion device instead of the BIOS chip 70 on the motherboard 80 to thereby protect the BIOS chip 70 on the motherboard 80 from being damaged. If content in the BIOS chip 10 is damaged, the expansion device will be disconnected from the motherboard 80 and connected to the burning device 90. The second connectors 30 of the expansion device are connected to the corresponding interface of the burning device 90. When the content in the BIOS chip 10 is replaced with intact content through the burning device 90, the expansion device can be reconnected to the motherboard 80.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A motherboard assembly, comprising:
a motherboard comprising a socket; and
an expansion device connected to the motherboard, comprising:
a first BIOS chip comprising a first signal choice terminal;
a first connector connected to the socket; and
at least one second connector capable of connecting to a burning device configured for restoring the first BIOS chip, the at least one second connector connected to the first BIOS chip;
wherein the motherboard comprises a second BIOS chip mounted thereon, the second BIOS chip comprises a second signal choice terminal; the socket comprises a first socket pin and a second socket pin connected to the first socket pin via a jumper; the first socket pin receives a choice signal of the motherboard; the choice signal is capable of enabling of corresponding BIOS chip; the second socket pin is connected to the second signal choice terminal of the second BIOS chip; the first connector comprises a first connector pin, and the first signal choice terminal is connected to the first connector pin;
wherein the first connector pin is connected to the first socket pin, therefore, the first signal choice terminal receiving the choice signal to enable the first BIOS chip when the expansion device is connected to the motherboard, and the jumper is in an off state to disconnect the second signal choice terminal and the choice signal to disable the second BIOS chip when the expansion device is connected to the motherboard.

2. The motherboard assembly as described in claim 1, wherein the at least one second connector is composed of two second connectors, each of the second connectors comprises four pins connected to corresponding pins of the first BIOS chip respectively.

3. The motherboard assembly as described in claim 1, wherein the second connector comprises eight pins, each pin connected to a corresponding pin of the first BIOS chip.

4. The motherboard assembly as described in claim 1, wherein the expansion device comprises a plate, the first BIOS chip mounted on the center of the plate, the first connector mounted on an edge of the plate.

5. The motherboard assembly of claim 1, wherein the choice signal is a low level voltage signal; the first connector further comprises a second connector pin which is connected to a high level voltage signal; and the second connector pin is connected to the second socket pin to send a high level voltage signal to disable the second BIOS chip when the expansion device is connected to the motherboard.

* * * * *